US008392721B2

(12) United States Patent
Kaleedhass et al.

(10) Patent No.: US 8,392,721 B2
(45) Date of Patent: Mar. 5, 2013

(54) METHOD AND SYSTEM TO ELECTRONICALLY IDENTIFY AND VERIFY AN INDIVIDUAL PRESENTING HIMSELF FOR SUCH IDENTIFICATION AND VERIFICATION

(75) Inventors: Karthik Kaleedhass, Darul Ehsan (MY); Lalitha Kaleedhass, Darul Ehsan (MY); Srikanthan Narayanaswamy, Darul Ehsan (MY)

(73) Assignee: Karsof Systems LLC, Anaheim, CA (US)

( * ) Notice: Subject to any disclaimer, the term of this patent is extended or adjusted under 35 U.S.C. 154(b) by 832 days.

(21) Appl. No.: 10/581,496

(22) PCT Filed: Dec. 1, 2004

(86) PCT No.: PCT/SG2004/000392

§ 371 (c)(1), (2), (4) Date: Jun. 27, 2007

(87) PCT Pub. No.: WO2005/054977

PCT Pub. Date: Jun. 16, 2005

(65) Prior Publication Data

US 2007/0253601 A1 Nov. 1, 2007

(30) Foreign Application Priority Data

Dec. 2, 2003 (MY) ............................... PI 20034609

(51) Int. Cl.
*H04L 29/06* (2006.01)

(52) U.S. Cl. ....................................................... 713/186

(58) Field of Classification Search ................... 713/186
See application file for complete search history.

(56) References Cited

U.S. PATENT DOCUMENTS

| | | | | |
|---|---|---|---|---|
| 6,256,737 | B1 * | 7/2001 | Bianco et al. | 713/186 |
| 7,246,243 | B2 * | 7/2007 | Uchida | 713/186 |
| 2002/0095317 | A1 * | 7/2002 | McCabe | 705/4 |
| 2002/0099858 | A1 * | 7/2002 | Lindo et al. | 709/250 |
| 2002/0169658 | A1 * | 11/2002 | Adler | 705/10 |
| 2008/0271116 | A1 * | 10/2008 | Robinson et al. | 726/2 |

OTHER PUBLICATIONS

"Why Computers Use Binary", http://chortle.ccsu.edu/java5/Notes/chap02/ch02_3.html, Jun. 19, 2006 from internet archive wayback machine. pp. 1-2.*

* cited by examiner

*Primary Examiner* — Farid Homayounmehr
*Assistant Examiner* — Lisa Lewis
(74) *Attorney, Agent, or Firm* — Maier & Maier, PLLC

(57) ABSTRACT

A method and a system of electronically identifying and verifying an individual utilizing at least one biometric features of the individual is disclosed. The method includes the steps of activating an access apparatus with a means to capture at least one biometric feature of an individual in a secure manner using dynamic encryption, capturing the biometric feature of an individual wherein key features of biometric raw data are extracted, encrypting in a dynamic manner the biometric features, transmitting the encrypted data of the biometric feature to at least one server; and verifying the biometric features captured in the fruit step with a pre-stored biometric feature in the server. Wherein upon positive identification and verification of the individual access is given to an auxiliary means such as but not limited to access to secured doors, database, computer network and servers.

19 Claims, 3 Drawing Sheets

METHOD AND SYSTEM TO ELECTRONICALLY IDENTIFY AND VERIFY AN INDIVIDUAL PRESENTING HIMSELF FOR SUCH IDENTIFICATION AND VERIFICATION

FIELD OF THE INVENTION

The invention relates to providing security using the biometrics features of an individual. More particularly the invention relates to a method and system to electronically identify and verify an individual presenting himself for such identification and verification. The various types of biometrics features include but not limited to fingerprint, iris, retina scan and DNA. The invention can be incorporated in other systems, which require authentication of users.

DESCRIPTION OF BACKGROUND ART

A person can be identified using his/her biometrics features. The biometrics features are generally unique to an individual and presence of two persons with similar biometrics features or a combination of biometrics features is rare and not unknown until today.

One of the important requirements of the of the security systems using biometrics is that the data used for ensuring the identity, the biometrics features for biometrics, must not be capable of duplication by any means.

But in present systems using card-based security, the data used to verify the identity is stored in the card itself and can be duplicated. The duplication of the card is made easy with the availability of the card copiers, a simple search for "Smart card copier" in the search engines such as www.google.com will provide many links and the resources for obtaining the copier tools.

When the data in the card is capable of duplication, the data can be also over-written or modified to control the access provided by the access control systems that are based on such cards.

There are many workarounds to prevent card duplication with the advancement of technologies, but at the same time, advancement is also made in technologies, such as card copier, risking the entire security infrastructure.

In case of biometrics, no special data is used or provided by the access control systems as compared to card-based systems. Instead the available data of the individual in form of biometrics features is used and such features are unique to the individual. Apart of the uniqueness, they should not be duplicated easily ensuring the effectiveness of the access control systems.

There are also methods available to duplicate the biometrics features. However the access control systems to shield against such attempts is rather impossible in case of card based systems. Some of the sensors that prevent the duplication of biometrics features are, but not limited to cell sensors and heat sensors.

The above sensors are available to prevent the duplication of biometrics features such sensors cannot be used in card based systems.

In case of security systems using biometrics, the features that are used for verification and identification must be secure enough to shield against attempts to swap entries between the individual (for example) all the stored database.

Hence the security of the biometrics features is highly important. An online method of verification and identification of the biometrics features is needed. In the online method the biometrics features are stored in a server and these features are entities that are used to decide the authenticity of the individuals.

With such security sensitiveness of the biometrics features, the said biometric features need to be stored in a server computer located in a secure environment and to use them for authenticity verification of the biometrics features of an individual.

During the authenticity verification, the biometrics features of the "person to be verified" is extracted and sent to the server and all the comparison takes place in the server only. One of the important advantages of this method is that the comparison takes place in a secured environment, as the server itself is located in a secure environment.

This method is completely in contrast with the existing technologies that do the verification locally that is, at the access point itself. Access Point is referred to as the security perimeter in the description.

The processes in the invention have the following components:

- Access Point
- Client Software in the Access Point
- Biometrics Acquisition Devices attached or embedded to/with the Access Point
- Server Computer
- Database Server Software in Server Computer
- Biometrics Server Software in Server Computer Client software is a set of programs that reside at the Access Point that extracts the biometrics features from the "person to be verified" and transmits to the server for biometrics verification.

The biometrics acquisition devices are a set of computer hardware components that extract the biometrics raw data such as but not limited to fingerprint image in case fingerprint using fingerprint scanners, retina image in case of retina using retina scanners and iris image in case of iris using iris scanners.

The server computer is the computer hardware providing the computing platform for the database server and the biometrics server software. The server computer will be located in the secured environment.

The database server software is a set of computer software components that can be categorized or known as Relational Data Base Management System (RDBMS), Data Base Management System (DBMS), Object Relational Data Base Management System (ORDBMS). The examples of software systems are: Oracle® and Microsoft® SQL Server.

The biometrics server software is a set of computer software components that processes the biometrics features sent from the access point for registration or enrolment of the biometrics features and authentication of the biometrics features.

The authentication of the biometrics features can be categorized in two types, they are:

- Verification
- This is a type of authentication in which the person to be verified is pre-determined using other types of identifications such as manual means or using an unique number allocated to the individual. In this type of authentication, the person is only verified to ensure that the person has the exactly the same biometrics features as the known individual.
- Identification
- This is a type of authentication in which the person is identified using his/her biometrics features. In this type of authentication, the identification of the person is not pre-determined and the identification is solely based on the biometrics features.

SUMMARY OF INVENTION

A method of electronically identifying and verifying an individual utilising at least one biometric features of the individual is disclosed. The method includes the steps of activating an access apparatus with a means to capture at least one biometric feature of an individual in a secure manner using dynamic encryption, capturing the biometric feature of an individual wherein key features of biometric raw data are extracted, encrypting in a dynamic manner the biometric features, transmitting the encrypted data of the biometric feature to at least one server; and verifying the biometric features captured in the fruit step with a pre-stored biometric feature in the server.

Wherein upon positive identification and verification of the individual access is given to an auxiliary means such as but not limited to access to secured doors, database, computer network and servers. The server is either spatially separated from the access apparatus or is contained within the access apparatus. The encrypted data is transmitted to at least one server in the access apparatus or to at least one server spatially separated from the access apparatus.

In a first attempt the access apparatus will attempt to send the encrypted data to the spatially separated server. Upon detecting a failure in the first attempt, the access apparatus will in a second attempt send the encrypted data to any other designated server in a network, and wherein the designated servers are either servers spatially separated from the access apparatus or the servers in the access apparatus. Prior to any identification or verification of any individual, the individual is enrolled into a database by including the steps of imputing required particulars of the individual into the database and ascertaining the existence or otherwise of the particulars of the individual in the database, capturing the biometric features of the individual wherein key features of the biometric raw data are extracted, encrypting in a dynamic manner the biometric features, and transmitting the encrypted data of the biometric features to the server and storing the encrypted data in relation to the particulars of the individual obtained earlier. The particulars of the individual include alpha-numeral data, and/or images and/or binary data wherein the binary data includes any representation capable of being stored in a binary form. At least one spatially separated server can be located outside the country. Further the server can be provided in a storage medium including a token or other device capable of recording data.

The identification of the individual is executed by comparing the biometric features of the individual captured with known biometric features of the individual previously captured and stored in a database and picked out from the database by the use of a unique personal identification number (PIN) allocated to the individual and to the records in the database. The method can be unfigured to be used without the use of PIN. The biometric features of the individual to be identified and verified are stored in a server instead of in any storage medium held in possession by or issued to individual. The encrypted biometric features of the individual are processed by an biometric server software located at the server instead of at the point where the biometric features of an individual presenting for identification and verification are captured.

The invention further discloses an electronic means of identifying and verifying an individual presenting for such identification and verification including a means to capture at least one type of biometric features of the individual, a software means to encrypt in a dynamic manner the biometric features captured earlier, a transmission means wherein the encrypted biometric features of the individual is transmitted to a server, a software means to capture the encrypted biometric features presented for identification and verification against stored encrypted biometric features of a purported individual, and a means to give access to other database or software if a positive identification and verification is made and to deny such access if a negative identification and verification is made. An electronic means of identifying and verifying an individual as claimed in claim 15 wherein identifying the individual comprises of a PIN number for each stored encrypted biometric features of an individual, and a means to access the stored encrypted biometric features of an individual by the provision of a correct PIN number by an individual presenting for identification and verification and a means to compare the captured biometric features of the individual with a given PIN number with the stored biometric features of the purported individual.

In another aspect the invention includes an access apparatus with a means to capture at least one biometric raw data of an individual in a secure manner using dynamic encryption, circuitry to extract any features of the biometric raw data from the means to capture the biometric raw data, circuitry to encrypt the key features of the biometric raw data in a dynamic manner, transmission means to transmit encrypted data of the biometric features to at least one server, at least one server to receive and store the encrypted data of the biometric feature of the individual, and circuitry to verify and/or identify the encrypted data against pre-stored encrypted biometric data in the server.

OVERVIEW

The invention disclosed herein uses biometrics technology to verify and also to identify an individual online using his/her physical or behavioral traits. Types of "biometrics" methods include fingerprint scanning, iris scanning, retina scanning, handwriting analysis, hand print recognition and voice recognition. The invention may also use the combination of all or some "biometrics" technology.

The invention disclosed herein utilizes "biometrics" technology for identification of individual reliably in small and large database environments consuming less amount of time.

The invention disclosed herein uses database server components to store the biometrics features for verification and identification. The database server software is a set of computer software components that can be categorized or known as Relational Data Base Management System (RDBMS), Data Base Management System (DBMS), Object Relational Data Base Management System (ORDBMS). The examples of software systems are: Oracle® and Microsoft® SQL Server.

The invention disclosed herein uses biometrics features stored in a server to identify and also to verify an individual using biometrics features that he/she currently has.

The invention disclosed herein uses a biometrics server software in the server that processes, verifies and identifies an individual at the server instead of at the access point.

The invention disclosed herein includes a method of enrolment of the biometrics features for new and unknown users through online methods.

The invention uses biometrics acquisition devices for extracting the biometrics raw data of an individual.

The invention disclosed herein includes two methods of authentication of the biometrics features, they are verification and identification, Verification This is a type of authentication in which the person to be verified is pre-determined using other types of identifications such as manual means or using an unique number allocated to the individual. In this type of authentication, the person is only verified to ensure that the person has the exactly the same biometrics features as the known individual.

Identification

This is a type of authentication in which the person is identified using his/her biometrics features. In this type of authentication, the identification of the person is not pre-determined and the identification is solely based on the biometrics features.

The invention disclosed herein can be used to avoid identity thefts and/or prevent unauthorized entry into computer networks or other electronic database systems.

The invention disclosed herein includes a step for encrypting the biometrics raw data extracted from the individual before they are sent to the server.

FIG. 1

Figure 1:
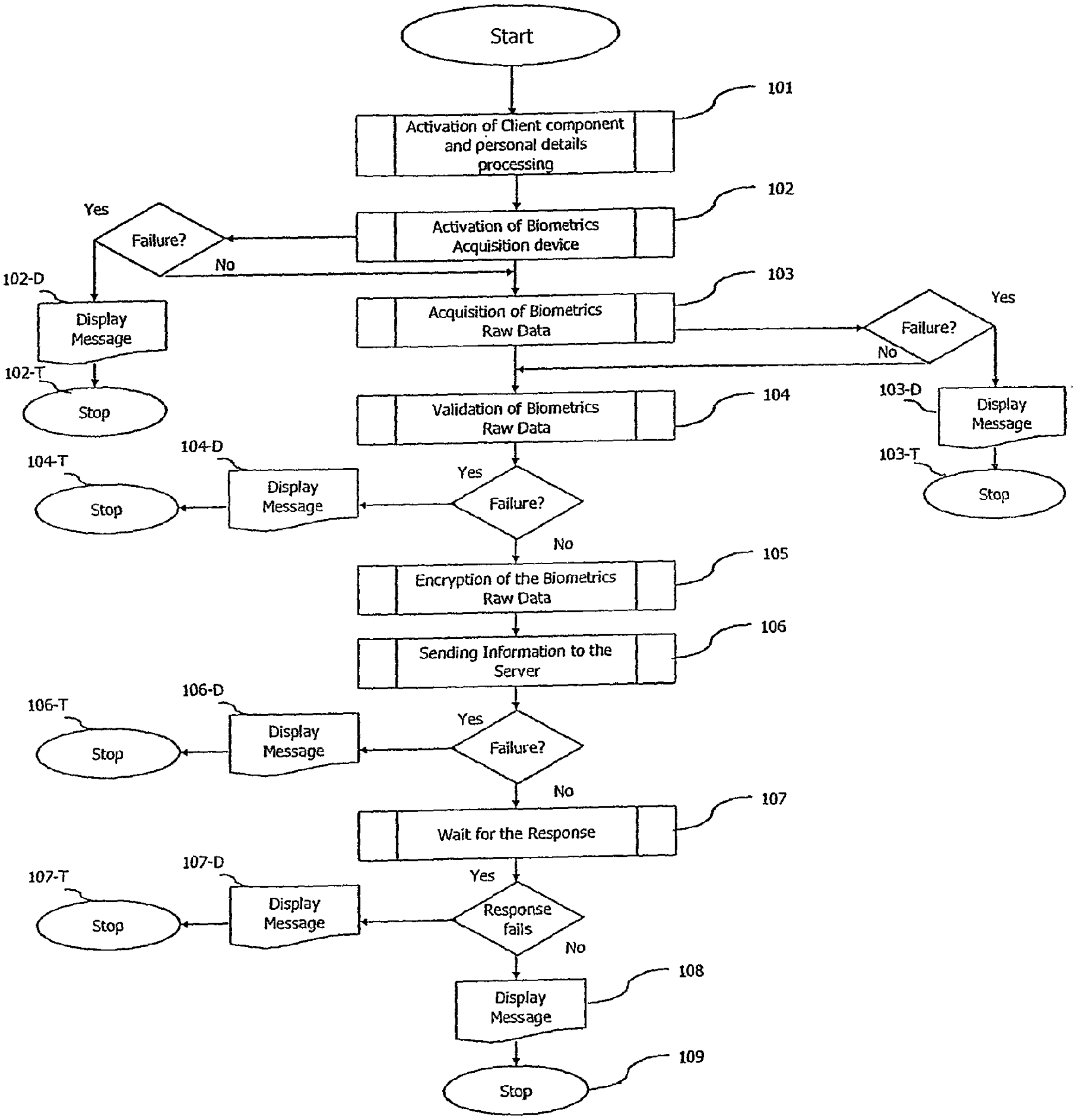
FIG. 1 is a flow diagram of the process of enrollment of biometrics features to be used for verification and identification.

FIG. 1, is a flow diagram of the process of online enrollment of biometrics features for new and/or unregistered users. These users are not known to the system and their information will be non-existent in the database.

The process involves the following components:

- Registration Terminal
- Client Software in the Registration Terminal
- Biometrics Acquisition Devices attached or embedded to/with the Registration Terminal
- Server Computer
- Database Server Software in Server Computer
- Biometrics Server Software in Server Computer The enrolment process is called as registration is carried out at the Registration Terminal that will relay the information to the server computer in a secured communication channel.

The server computer will be located in a physically secured location and will hold the database of user information along with their biometrics features. The biometrics features with the personal information are stored in the database upon receiving the relayed information from the Registration Terminal.

The database of personal information along with the biometrics features will be maintained at the server computer using one or more or all combinations of commonly used database software systems that can be categorized or known as Relational Data Base Management System (RDBMS), Data Base Management System (DBMS), Object Relational Data Base Management System (ORDBMS).

In the database system, the biometrics features will have to be stored along with personal information or they can be stored separately and linked using a common identifier. The identifier will be but not limited to a constant, system generated or any combination.

The server computer will also hold and execute the Biometrics Server Software that processes the enrolment request sent from the Registration Terminal. The biometrics server software is integrated with the Database System to store the biometrics features.

This process includes the enrolment of the personal information after its non-existence in the database is confirmed. The non-existence confirmation is carried out by searching for the identification number, personal name and other details of the personnel in the database. During the enrolment of the personal information a PIN is also allocated for the process mentioned in the FIG. 2.

For the PIN allocation, all appropriate measures should be taken to prevent using an existent PIN resulting in PIN duplication. This prevention can be accomplished by searching the database using the "to be allocated PIN number" and if a match is found, the usage of that PIN can be prevented. However there are many other methods commonly available to avoid the duplication and they are all prior art.

If the search was not successful and when no records exist related to the personnel, the personal details will have to be created. The process of registration of the personal information is prior art and commonly known method.

The process of online enrollment of biometrics features for new and/or unregistered users starts with the activation of the client software program at the Registration Terminal in step 101. The activation of the client component will be as a result of user interaction and his/her intent to enroll as a person.

The user at the Registration terminal should be an authorized personnel and is prior art.

In the step 101, the existence of the personal details is verified and if not found, the details are created. The method for creation and verifying the existence of the personal details is prior art.

Upon successful verification of the personal details, the process continues from the step 102 in which the biometrics acquisition device such as but not limited to Fingerprint scanners in case of fingerprint, Iris scanners in case of Iris and Retina Scanners in case of Retina, is activated from the client software.

The activation step of the biometrics acquisition devices also includes recognizing the biometrics acquisition device, its connectivity and establishing of the communication channel. These steps are required for acquisition of the biometrics features from the device and are provided by the driver software or the Software Development Kit provided by the Biometrics acquisition supplier.

However the driver software can be also developed using the technical specifications provided by the supplier. These methods are for the integration of the biometrics acquisition device with the software systems and are known technology and they are prior art.

If there is a failure in activation of the biometrics acquisition device, an informational message is displayed in step 102-D and the process terminates immediately at step 102-T.

Upon successful activation of the biometrics acquisition device in step 102, the process continues from the step 103 where acquisition of the biometrics raw data is carried out. The biometrics raw data is any of the following but not limited to fingerprint image in case of Fingerprint, Iris image in case of Iris, Retina image in case of Retina. The biometrics raw data type varies based on biometrics types used such as but not limited to Fingerprint, Iris, Retina and DNA.

In case of any failure in the step 103, the process displays an informational message to the user in the step 103-D and terminates at 103-T.

Upon successful acquisition of the biometrics raw data, validation of the biometrics raw data in the step 104 will be carried out. The validation of the biometrics raw data includes verification of the required characteristics presence on the biometrics raw data and the criteria for the required characteristics will vary based on the biometrics type such as but not limited to Iris, Fingerprint, and Retina. The list are required characteristics that should be present in the biometrics raw are commonly known and are prior art.

If the validation fails, the process displays an information message to the user in the step 104-D and terminates at 104-T.

However if the validation was successful, the process continues from step 105 where the biometrics raw data obtained at the step 103, is encrypted. The purpose of the encryption of the raw data is to secure the raw data from tampering and eavesdropping when it is sent to the server in step 106. The method of encryption will be selected based on the environment with the following factors taken into account:

Computing power of the Registration Terminal
Computing power of the Server computer
Network bandwidth The types of encryption include but not limited to 1) Asymmetric Encryption where keys used for encryption and/or decryption come in pairs and 2) Symmetric Encryption where the same key is used for Encryption and Decryption.

The type of encryption is also selected based on the operational issues. However the combination of the two types of encryption can also be used for added security with all the above factors taken into account.

Upon successful encryption of the biometrics raw data, in step 106, the biometrics raw data is sent to the Biometrics Server Software running at the Server Computer. As a requirement to this step, a communication channel will have to be established between the Server Computer and the Registration Terminal using the encryption as mentioned above.

The method of sending the biometrics raw data is by using TCP network protocol by connecting to a network port listening on the Server. The application protocol for the TCP will have to be selected automatically based on the above factors for encryption. The commonly used line-based application level protocol is recommended as used in FTP defined in RFC 959 available at the URL http://www.ietf.org/rfc/rfc0959.txt?number=959 as of now.

In case of failure during sending the information to the server in step 106, the process will display an informational message in the step 106-D and terminates at 106-T.

Upon sending the biometrics data successfully to the Biometrics server software, the client software in the Registration terminal in the step 107, will wait for the response from the Server. The response will contain the status of the registration that will include but not limited to Success state and Failure State.

Finally in the step 108, the state of the registration sent by the Server (Failure or Success) is displayed to the user and the process terminates at step 109.

FIG. 2

Figure 2:
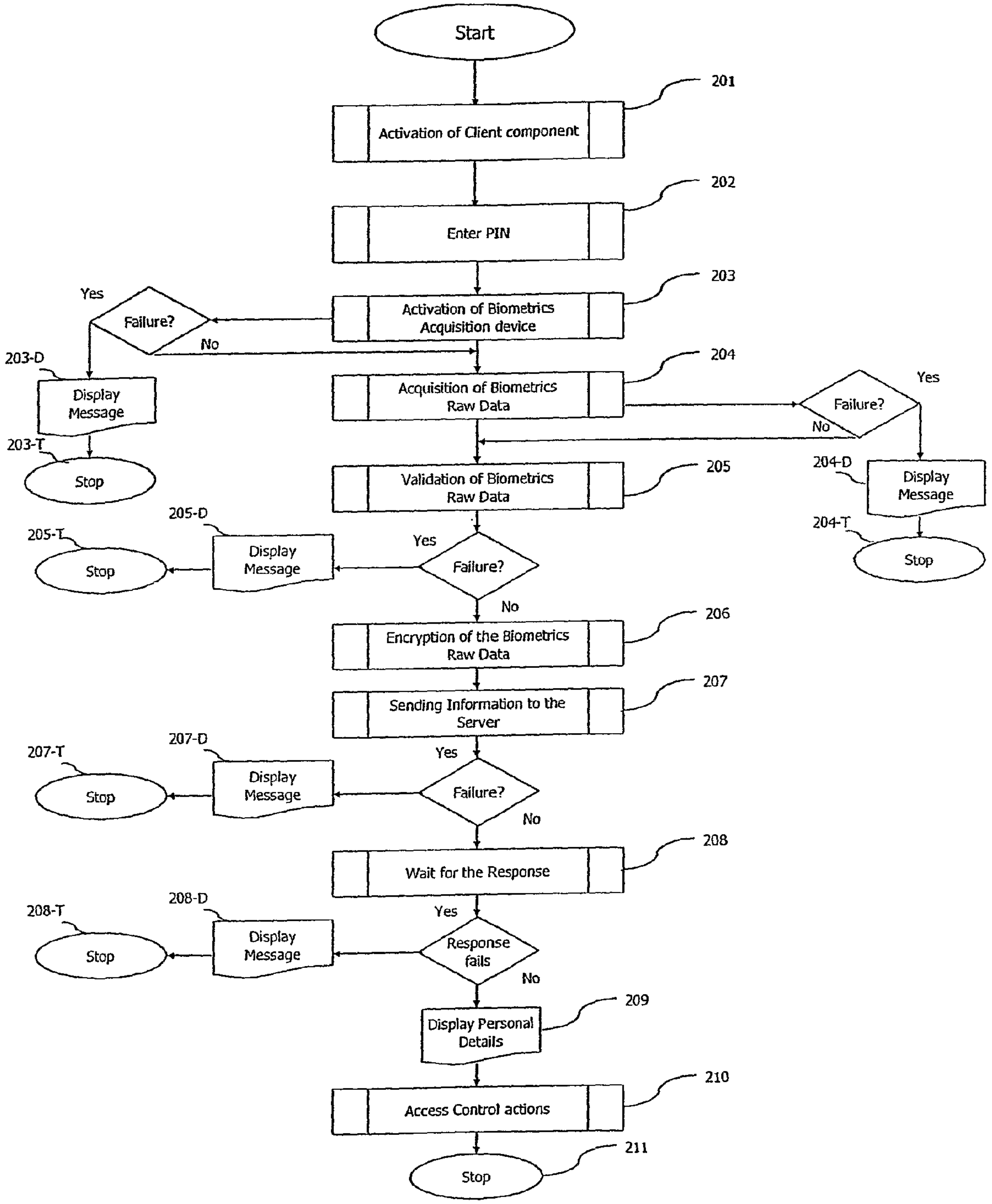
FIG. 2 is a flow diagram of the process of verification of the biometrics features.

FIG. 2, is a flow diagram of the process of verification of biometrics features of an individual (user). The main requirement for this process is that the individual must be enrolled using the process mentioned in the FIG. 1 and a unique PIN should be allocated. If the user is not enrolled, the enrolment process must be completed for this user before the user gets access in this process.

This process will be carried out at the following but not limited to access points, check points that use biometrics verification. The process can also be used in any area that requires biometrics verification with the server. The location of usage of this process is referred to as "Access Point" in this process.

The process involves the following components:

Access Point
Client Software in the Access Point
Biometrics Acquisition Devices attached or embedded to/with the Access Point
Server Computer
Database Server Software in Server Computer
Biometrics Server Software in Server Computer The server computer will be located in a physically secured location and will hold the database of user information along with their biometrics features.

The database of personal information along with the biometrics features will be maintained at the server computer using one or more or all combinations of commonly used database software systems that can be categorized or known as Relational Data Base Management System (RDBMS), Data Base Management System (DBMS), Object Relational Data Base Management System (ORDBMS).

In the database system, the biometrics features will have to be stored along with personal information or they can be stored separately and linked using a common identifier. The identifier will be but not limited to a constant, system generated or any combinations.

The server computer will also hold and execute the Biometrics Server Software that processes the verification request sent from the Access Point. The biometrics server software is integrated with the Database System to access the registered biometrics features for verification.

The process of online verification of biometrics features starts with the activation of the client software program at the Access Point in step 201. The activation of the client component will be as a result of user interaction and his/her intent for verification.

Upon successful activation of the client component in the step 201, in step 202 the PIN or a unique number allocation to the individual is accepted from the user at the Access Point. The method of acceptance can be using a Graphical User Interface or manual methods. The client software in the Access Point should have this functionality to accept the number given by the user.

At this step the user must provide the exact number allocated at the process in the FIG. 1. Providing the wrong number will result in verification failure.

When a number is entered by the user, the process continues from step 203 at which the biometrics acquisition devices such as but not limited to Fingerprint scanners in case of fingerprint, Iris scanners in case of Iris and Retina Scanners in case of Retina, is activated from the client software.

The activation step of the biometrics acquisition devices also includes recognizing the biometrics acquisition device, its connectivity and establishing of the communication channel. These steps are required for acquisition of the biometrics features from the device and are provided by the driver software or the Software Development Kit provided by the Biometrics acquisition device supplier.

However the driver software can be also developed using the technical specifications provided by the supplier. These methods are for the integration of the biometrics acquisition device with the software systems and are known technology and they are prior art.

If there is a failure in activation of the biometrics acquisition device, an informational message is displayed in step 203-D and the process terminates immediately at step 203-T.

Upon successful activation of the biometrics acquisition device in step 203, the process continues from step 204 where acquisition of the biometrics raw data is carried out. The biometrics raw data is any of the following but not limited to fingerprint image in case of Fingerprint, Iris image in case of Iris, Retina image in case of Retina. The biometrics raw data type varies based on biometrics types used such as but not limited to Fingerprint, Iris, Retina and DNA.

In case of any failure in the step 204, the process displays an informational message to the user in the step 204-D and terminates at 204-T.

Upon successful acquisition of the biometrics raw data, the validation of the biometrics raw data in step 205 is carried out. The validation of the biometrics raw data includes verification of the required characteristics present on the biometrics raw data and the criteria for the required characteristics will vary based on the biometrics type such as but not limited to Iris, Fingerprint, and Retina. The list of required characteristics that should be present in the biometrics raw are commonly known and are prior art.

If the validation fails, the process displays an information message to the user in the step 205-D and terminates at 205-T.

However if the validation was successful, the process continues from the step 206 where the biometrics raw data obtained at the step 204, is encrypted. The purpose of the encryption of the raw data is to secure the raw data from tampering and eavesdropping when it is sent to the server in the step 207. The method of encryption will be selected based on the environment with the following factors taken into account:

Computing power of the Registration Terminal
Computing power of the Server computer
Network bandwidth The types of encryption include but not limited to 1) Asymmetric Encryption where keys used for encryption and/or decryption come in pairs and 2) Symmetric Encryption where the same key is used for Encryption and Decryption.

The type of encryption is also selected based on operational issues. However the combination of the two types of encryption can also be used for added security with all the above factors taken into account.

Upon successful encryption of the biometrics raw data, in step 207, the biometrics raw data is sent to the Biometrics Server Software running at the Server Computer. As a requirement to this step, a communication channel will have to be established between the Server Computer and the Registration Terminal using the encryption as mentioned above.

The method of sending the biometrics raw data will be using TCP network protocol by connecting to a network port listening on the Server. The application protocol for the TCP will have to be selected automatically based on the above factors for encryption. The commonly used line-based application level protocol is recommended as used in FTP defined in RFC 959 available at the URL http://www.ietf.org/rfc/rfc0959.txt?number=959 as of now.

In case of failure during sending the information to the server in step 207, the process will display an informational message in the step 207-D and terminates at 207-T.

Upon sending the biometrics data successfully to the Biometrics server software, the client software in the Registration terminal in the step 208, will wait for the response from the Server. The response will contain the status of the registration that will include but not limited to Success state and Failure State.

If the success state in sent by the server in the step 208, the client software will display the Personal information sent by the server in step 209. The information includes but not limited to:

National ID Number (IC No.)
Name
Photograph

But in case of failure state in the step 208, an informational message will be displayed to the user in the step 208-D and the process will be restart from the step 201.

With the success state in the step 208 and after displaying the information in the step 209, the process will continue from step 210 where the required access control actions such as but not limited to permitting access to other accounts, database, activating the door (attached to the access point), opening the gate (attached to the access point) will be carried out.

The commonly used method of the activating a door, for example, is by sending a set of alphabetic characters such as "ABCDEFGH" to the serial port such as COM1 or COM2 (based on the configuration) that generates the electronic signal enough to trigger the lock mechanism. However such methods are known technology and are prior art.

Finally the process will terminate at the step 211.

FIG. 3

Figure 3:
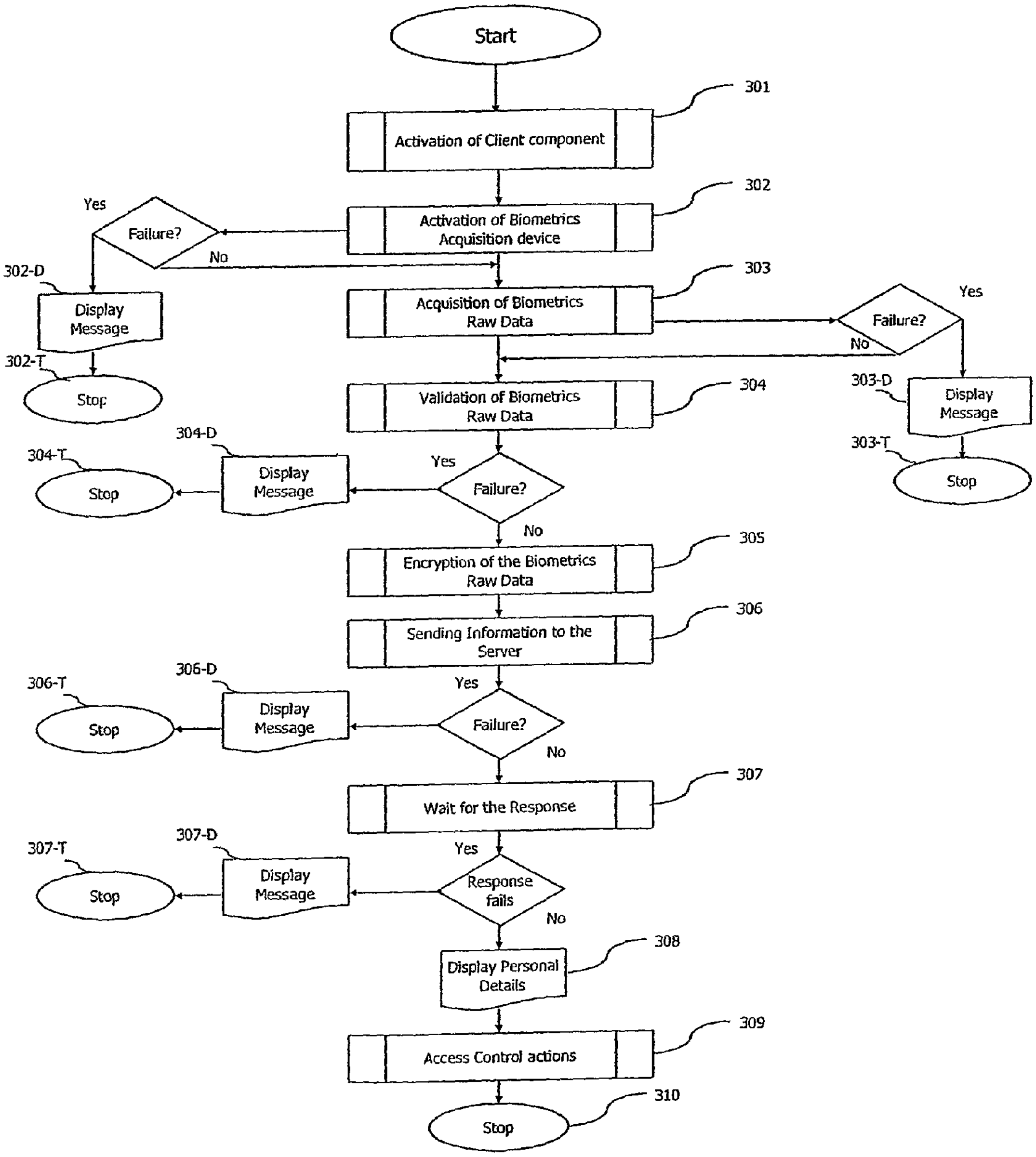
FIG. 3 is a flow diagram of the process of identification of the biometrics features.

FIG. 3, is a flow diagram of the process of identification of biometrics features of an individual (user). The main requirement for this process is that the individual must be enrolled using the process mentioned in the FIG. 1. If the user is not enrolled, the enrolment process must be completed for this user before the user gets access in this process.

This process will be carried out at the following but not limited to access points, check points that use biometrics identification. The process can also be used in any area that requires biometrics identification with the server. The location of usage of this process is referred to as "Access Point" in this process.

The process involves the following components:

Access Point
Client Software in the Access Point
Biometrics Acquisition Devices attached or embedded to/with the Access Point
Server Computer
Database Server Software in Server Computer
Biometrics Server Software in Server Computer The server computer will be located in a physically secured location and will hold the database of user information along with their biometrics features.

The database of personal information along with the biometrics features will be maintained at the server computer using one or more or all combinations of commonly used database software systems that can be categorized or known as Relational Data Base Management System (RDBMS), Data Base Management System (DBMS), Object Relational Data Base Management System (ORDBMS).

In the database system, the biometrics features will have to be stored along with personal information or they can be stored separately and linked using a common identifier. The identifier will be but not limited to a constant, system generated or any combinations.

The server computer will also hold and execute the Biometrics Server Software that processes the verification request sent from the Access Point. The biometrics server software is integrated with the Database System to access the registered biometrics features for verification.

The process of online identification of biometrics features for starts with the activation of the client software program at the Access Point in step 301. The activation of the client component will be as a result of user interaction and his/her intent for identification.

Upon successful activation of the client component in the step 301, the process continues from the step 302 at which the biometrics acquisition devices such as but not limited to Fingerprint scanners in case of fingerprint, Iris scanners in case of Iris and Retina Scanners in case of Retina, is activated from the client software.

The activation step of the biometrics acquisition devices also includes recognizing the biometrics acquisition device, its connectivity and establishing of the communication channel. These steps are required for acquisition of the biometrics features from the device and are provided by the driver software or the Software Development Kit provided by the Biometrics acquisition supplier.

However the driver software can be also developed using the technical specifications provided by the supplier. These methods are for the integration of the biometrics acquisition device with the software systems and are known technology and they are prior art.

If there is a failure in activation of the biometrics acquisition device, an informational message is displayed in step 302-D and the process terminates immediately at step 302-T.

Upon successful activation of the biometrics acquisition device in step 302, the process continues from the step 303 where acquisition of the biometrics raw data is carried out. The biometrics raw data is any of the following but not limited to fingerprint image in case of Fingerprint, Iris image in case of Iris, Retina image in case of Retina. The biometrics raw data type varies based on biometrics types used such as but not limited to Fingerprint, Iris, Retina and DNA.

In case of any failure in the step 303, the process displays an informational message to the user in the step 303-D and terminates at 303-T.

The successful acquisition of the biometrics raw data follows the validation of the biometrics raw data in the step 304. The validation of the biometrics raw data includes verification of the required characteristics presence on the biometrics raw data and the criteria for the required characteristics will vary based on the biometrics type such as but not limited to Iris, Fingerprint, and Retina. The list are required characteristics that should be present in the biometrics raw are commonly known and are prior art.

If the validation fails, the process displays an information message to the user in the step 304-D and terminates at 304-T.

However if the validation was successful, the process continues from the step 305 where the biometrics raw data obtained at the step 305, is encrypted. The purpose of the encryption of the raw data is to secure the raw data from tampering and eavesdropping when it is sent to the server in the step 306. The method of encryption will be selected based on the environment with the following factors taken into account:

Computing power of the Registration Terminal

Computing power of the Server computer

Network bandwidth

The types of encryption include but not limited to 1) Asymmetric Encryption where keys used for encryption and/or decryption come in pairs and 2) Symmetric Encryption where the same key is used for Encryption and Decryption.

The type of encryption is also selected based on the operational issues, however the combination of the two types of encryption can also be used for added security with all the above factors taken into account.

Upon successful encryption of the biometrics raw data, in the step 306, the biometrics raw data is sent to the Biometrics Server Software running at the Server Computer. As a requirement to this step, a communication channel will have to be established between the Server Computer and the Registration Terminal using the encryption as mentioned above.

The method of sending the biometrics raw data will be using TCP network protocol by connecting to a network port listening on the Server. The application protocol for the TCP will have to be selected automatically based on the above factors for encryption. The commonly used line-based application level protocol is recommended as used in FTP defined in RFC 959 available at the URL http://www.ietf.org/rfc/rfc0959.txt?number=959 as of now.

In case of failure during sending the information to the server in step 306, the process will display an informational message in the step 306-D and terminates at 306-T.

Upon sending the biometrics data successfully to the Biometrics server software, the client software in the Registration terminal in the step 307, will wait for the response from the Server. The response will contain the status of the registration that will include but not limited to Success state and Failure State.

If the success state in sent by the server in the step 307, the client software will display the Personal information sent by the server in step 308. The information includes but not limited to:

National ID Number (IC No.)

Name

Photograph

But in case of failure state in the step 307, an informational message will be displayed to the user in the step 307-D and the process will be restart from the step 301.

With the success state in the step 307 and after displaying the information in the step 308, the process will continue from the step 309 where the required access control actions such as but not limited to activating the door (attached to the access point), opening the gate (attached to the access point) will be carried out.

The commonly used method of the activating the door, for example, is by sending a set of alphabetic characters such "ABCDEFGH" to the serial port such as COM1 or COM2 (based on the configuration) that generates the electronic signal enough to trigger the lock mechanism. However such methods are known technology and are prior art.

Finally the process will terminate at the step 310.

EXAMPLE

The invention as disclosed can be incorporated in several electronic systems where it is necessary to authenticate an individual designing to gain access to an electronic network such as ATM network point of sale (POS) counters and security access control system.

Where the system is incorporated in any ATM network the access apparatus is the ATM itself with either an incorporated biometric sensor device or biometric sensor device installed independently of the ATM but electronically/electrically linked to the ATM. The server containing the circuitry to store the encrypted biometric features can be:

(i) a server spatially distanced from the access apparatus;

(ii) a server spatially distanced from the access apparatus and a server installed within the access apparatus itself; and (iii) a plurality of servers spatially distanced from the access apparatus with or without servers at the access apparatus.

The provision of more than one server containing the encrypted biometric feature is necessary as a safety feature to ensure that if communication/transmission between a predesignated server is not possible, authentication can still be done at the other server.

This 'back up' system is absolutely essential where the system is incorporated in a door access system (to ensure that no one individual) is locked out/in an enclosed premise.

It will be evident from the description, that the use of a token is optional. The access apparatus can be activated by the keying in of a PIN and thereafter the verification and identification process is initiated.

An Illustration of the Invention Using a Sample Code Segment

The processes detailed above are explained below using the "C" Language code segments. The function referred are have the functions based on their names.

Enrollment:

```
/* start the enrollment processing */
if (!Personnel__Exists( )) {
      Create__Personnel( );
}
if (!Activate__Biometrics__Device( )) {
      Display__Error__Message( );
      Stop__Process( );
}
if (!Acquire__Biometrics__Raw__Data( )) {
      Display__Error__Message( );
      Stop__Process( );
}
if (!Validate__Biometrics__Raw__Data( )) {
      Display__Error__Message( );
      Stop__Process( );
}
Encrypt__Biometrics__Raw__Data( );
If (!Send__Encrypted__Data__To__Server( )) {
      Display__Error__Message( );
      Stop__Process( );
}
if (Response__From__Server( ) != "OK") {
      Display__Error__Message( );
      Stop__Process( );
}
Display__OK__Message( );
Stop__Process( );
```

Verification:

```
int PIN = 0;
/* start the verification processing */
Activate__Client__Component( );
PIN = Get__PIN( );
if (!Activate__Biometrics__Device( )) {
      Display__Error__Message( );
      Stop__Process( );
}
if (!Acquire__Biometrics__Raw__Data( )) {
      Display__Error__Message( );
      Stop__Process( );
}
if (!Validate__Biometrics__Raw__Data( )) {
      Display__Error__Message( );
      Stop__Process( );
}
Encrypt__Biometrics__Raw__Data( );
If (!Send__Encrypted__Data__To__Server( )) {
      Display__Error__Message( );
      Stop__Process( );
}
```

Identification:

```
/* start the verification processing */
Activate__Client__Component( );
if (!Activate__Biometrics__Device( )) {
      Display__Error__Message( );
      Stop__Process( );
}
if (!Acquire__Biometrics__Raw__Data( )) {
      Display__Error__Message( );
      Stop__Process( );
}
if (!Validate__Biometrics__Raw__Data( )) {
      Display__Error__Message( );
      Stop__Process( );
}
Encrypt__Biometrics__Raw__Data( );
If (!Send__Encrypted__Data__To__Server( )) {
      Display__Error__Message( );
      Stop__Process( );
}
if (Response__From__Server( ) != "OK") {
      Display__Error__Message( );
```

The functions in the above sample code segments will have to use the global variables to exchange the information between the functions.

The invention claimed is:

1. A method of electronically identifying and verifying an individual utilizing at least one biometric feature of the individual including the steps of:

enrolling an individual into a database including:

(a) inputting required particulars of the individual into the database and ascertaining the existence or otherwise of the particulars of the individual in the database, wherein the particulars include at least one of images and binary data, wherein the binary data include any representation capable of being stored in a binary form;

(b) capturing the biometric features of the individual wherein key features of the biometric raw data are extracted;

(c) encrypting in a dynamic manner the biometric features, the method of encryption selected based on factors including the computing power of a registration computer, the computing power of a server computer, and network bandwidth; and (d) transmitting the encrypted data of the biometric features to the server and storing the encrypted data in relation to the particulars of the individual obtained in step (a) above;

verifying an individual in the database including:

(i) activating an access apparatus with a means to capture at least one biometric feature of an individual in a secure manner using dynamic encryption;

(ii) capturing the at least one biometric feature of an individual wherein key features of biometric raw data are extracted;

(iii) encrypting in a dynamic manner the at least one biometric feature, a method of encryption selected based on factors including the computing power of a registration computer, the computing power of a server computer, and network bandwidth;

(iv) transmitting the encrypted data of the at least one biometric feature from the access apparatus to at least one server in the access apparatus or to at least one server spatially separated from the access apparatus, wherein in a first attempt the access apparatus will attempt to send the encrypted data to the spatially separated server and upon detecting a failure in the first attempt, the access apparatus will in a second attempt send the encrypted data to any other designated server in a network, wherein the designated servers are either servers spatially separated from the access apparatus or the servers in the access apparatus; and (v) verifying the at least one biometric feature captured in step (i) with a pre-stored biometric feature in the server in step (iv), wherein at least one spatially separated server is located outside the country and wherein upon positive identification and verification of the individual access is given to an auxiliary means including access to secured doors, database, computer network and servers, and wherein the biometric features include fingerprint, retina, iris, palm print, face, handwriting, handprint, signature and voice recording biometric features capable of being captured by a scanner.

2. A method of electronically identifying and verifying an individual as claimed in claim 1 wherein the server is either spatially separated from the access apparatus or is contained within the access apparatus.

3. A method of electronically identifying and verifying an individual as claimed in claim 1, wherein the particulars in step (a) further include alpha-numeral data.

4. A method of electronically identifying and verifying an individual as claimed in claim 1 wherein the server is provided in a storage medium or other device capable of recording data.

5. A method of electronically identifying and verifying an individual as claimed in claim 1 wherein the identification of the individual is executed by comparing the biometric features of the individual captured in step (ii) of claim 1 with known biometric features of the individual previously captured and stored in a database and picked out from the database by the use of a unique personal identification number (PIN) allocated to the individual and to the records in the database.

6. A method of electronically identifying and verifying an individual as claimed in claim 1 wherein the identification of the individual is executed by comparing the biometric features of the individual captured in step (ii) of claim 1 with known biometric features of the individual previously captured and stored in the database without the use of any PIN numbers.

7. A method of electronically identifying and verifying an individual as claimed in claim 1 wherein the biometric features of the individual to be identified and verified are stored in a server instead of in any storage medium held in possession by or issued to individual.

8. A method of electronically identifying and verifying an individual as claimed in claim 1 wherein the encrypted biometric features of the individual are processed by an biometric server software located at the server instead of at the point where the biometric features of an individual presenting for identification and verification are captured.

9. An electronic means of identifying and verifying an individual presenting for such identification and verification including:

a means to enroll an individual into a database including:

(a) a means to input required particulars of the individual into the database and ascertaining the existence or otherwise of the particulars of the individual in the database, wherein the particulars include at least one of images and binary data, wherein the binary data include any representation capable of being stored in a binary form;

(b) a means to capture the biometric features of the individual wherein key features of the biometric raw data are extracted;

(c) a means to encrypt in a dynamic manner the biometric features, the method of encryption selected based on factors including the computing power of a registration computer, the computing power of a server computer, and network bandwidth; and (d) a means to transmit the encrypted data of the biometric features to the server and storing the encrypted data in relation to the particulars of the individual obtained in step (a) above;

a means to verify an individual in the database including:

(i) a means to capture at least one type of biometric features of the individual;

(ii) a software means to encrypt in a dynamic manner the biometric features captured in (i), a method of encryption selected based on factors including the computing power of a registration computer, the computing power of a server computer, and network bandwidth;

(iii) a transmission means wherein the encrypted biometric features of the individual are transmitted from an access apparatus to a server;

(iv) a software means to capture the encrypted biometric features presented for identification and verification against stored encrypted biometric features of a purported individual; and (v) a means to give access to other database or software if a positive identification and verification is made and to deny such access if a negative identification and verification is made, wherein the biometric features include fingerprint, retina, iris, palm print, face, handwriting, handprint, signature and voice recording biometric features capable of being captured by a scanner.

10. An electronic means of identifying and verifying an individual as claimed in claim 9 wherein identifying the individual comprises:

a PIN number for each stored encrypted biometric features of an individual; and a means to access the stored encrypted biometric features of an individual by the provision of a correct PIN number by an individual presenting for identification and verification and a means to compare the captured biometric features of the individual with a given PIN number with the stored biometric features of the purported individual.

11. A method of electronically identifying and verifying an individual as claimed in claim 9 wherein the biometric features further include finger print, retina scan, iris scan or any other unique biometric features capable of being captured by sensors.

12. An electronic means of identifying and verifying an individual as claimed in claim 9 wherein the biometric features further include finger print, retina scan, iris scan or any other unique biometric features capable of being captured by sensors.

13. An electronic means of identifying and verifying an individual presenting for such identification and verification including:

a means to enroll an individual into a database including:

(a) a means to input required particulars of the individual into the database and ascertaining the existence or otherwise of the particulars of the individual in the database, wherein the particulars include at least one of images and binary data, wherein the binary data include any representation capable of being stored in a binary form;

(b) a means to capture the biometric features of the individual wherein key features of the biometric raw data are extracted;

(c) a means to encrypt in a dynamic manner the biometric features, the method of encryption selected based on factors including the computing power of a registration computer, the computing power of a server computer, and network bandwidth; and (d) a means to transmit the encrypted data of the biometric features to the server and storing the encrypted data in relation to the particulars of the individual obtained in step (a) above;

a means to verify an individual in the database including:

(i) access apparatus with a means to capture at least one biometric raw data of an individual in a secure manner using dynamic encryption, wherein the biometric raw data include fingerprint, retina, iris, palm print, face, handwriting, handprint, signature and voice recording biometric features capable of being captured by a scanner;

(ii) circuitry to extract any features of the biometric raw data from the means to capture the biometric raw data;

(iii) circuitry to encrypt the key features of the biometric raw data in a dynamic manner, a method of encryption selected based on factors including the computing power of a registration computer, the computing power of a server computer, and network bandwidth;

(iv) transmission means to transmit encrypted data of the biometric features from the access apparatus to at least one server;

(v) at least one server to receive and store the encrypted data of the biometric feature of the individual; and (vi) circuitry to at least one of verify and identify the encrypted data against pre-stored encrypted biometric data in the server.

14. An electronic means of identifying and verifying an individual as claimed in claim 13 wherein the server is either spatially separated from the access apparatus or is contained within the access apparatus.

15. An electronic means of identifying and verifying an individual as claimed in claim 13, which includes circuitry of transmission of encrypted biometric data to a pre-designated server, wherein if transmission of encrypted biometric data to a pre-designated server fails, the encrypted biometric data is routable to at least one other designated server in a pre-designated sequence.

16. An electronic means of identifying and verifying an individual as claimed in claim 13, wherein a token encoding data unique to the individual presenting for identification and verification has to be introduced into the access apparatus before the biometric feature of the individual is captured.

17. An electronic means of identifying and verifying an individual as claimed in claim 13, wherein the biometric data of an individual is stored in a encrypted manner in server and in any tokens if used.

18. An electronic means of identifying and verifying an individual as claimed in claim 13, wherein the means requires the introduction of a personal identification number (PIN) of an individual presenting for identification and verification into the access apparatus.

19. An electronic means of identifying and verifying an individual presenting for such identification and verification as claimed in claim 13, wherein the biometric raw data in step (i) further include finger print.

* * * * *

UNITED STATES PATENT AND TRADEMARK OFFICE

CERTIFICATE OF CORRECTION

PATENT NO. : 8,392,721 B2
APPLICATION NO. : 10/581496
DATED : March 5, 2013
INVENTOR(S) : Kaleedhass et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1340 days.

Signed and Sealed this
First Day of September, 2015

Michelle K. Lee
*Director of the United States Patent and Trademark Office*